United States Patent [19]

Kotera et al.

[11] 4,239,968

[45] Dec. 16, 1980

[54] METHOD AND APPARATUS FOR RECORDING AND REPRODUCING A RADIATION IMAGE

[75] Inventors: Noboru Kotera; Syusaku Eguchi, both of Odawara; Junji Miyahara, Minami-ashigara; Seiji Matsumoto, Minami-ashigara; Hisatoyo Kato, Minami-ashigara, all of Japan

[73] Assignee: Fuji Photo Film Co., Ltd., Minami-ashigara, Japan

[21] Appl. No.: 57,091

[22] Filed: Jul. 12, 1979

[30] Foreign Application Priority Data

Jul. 12, 1978 [JP] Japan .................................. 53-84744

[51] Int. Cl.³ .............................................. G03C 5/16
[52] U.S. Cl. ................................. 250/327.1; 250/484
[58] Field of Search ..................... 250/327.1, 337, 484; 252/301.4 R, 301.6 R

[56] References Cited

U.S. PATENT DOCUMENTS

| | | | |
|---|---|---|---|
| 3,188,467 | 6/1965 | Weissenberg | 250/337 |
| 3,207,896 | 9/1965 | Meaney et al. | 250/327.1 |
| 3,453,436 | 7/1969 | Nail | 250/484 |
| 3,859,527 | 1/1975 | Luckey | 250/337 |
| 3,975,637 | 8/1976 | Ikedo et al. | 250/327.1 |

*Primary Examiner*—Davis L. Willis
*Attorney, Agent, or Firm*—Gerald J. Ferguson, Jr.; Joseph J. Baker

[57] ABSTRACT

A radiation image is recorded on a stimulable phosphor and the recorded image is reproduced by utilizing the stimulability of the phosphor. As the phosphor is used an alkaline earth metal fluorohalide phosphor having high stimulability represented by the formula $$(Ba_{1-x}M_x^{II})FX:yA$$

wherein $M^{II}$ is at least one divalent metal selected from the group consisting of Mg, Ca, Sr, Zn and Cd, X is at least one halogen selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$.

10 Claims, 5 Drawing Figures

F I G. 3
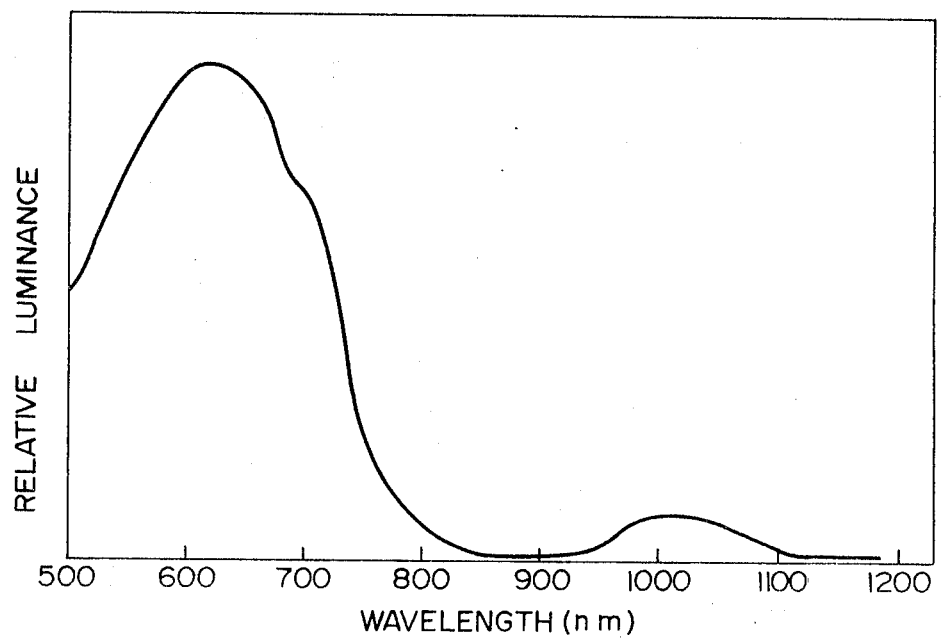
F I G. 4
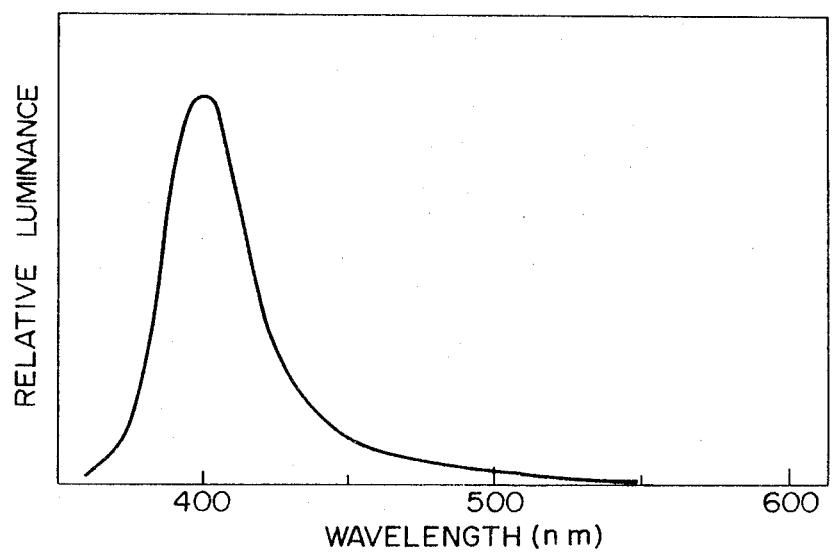

METHOD AND APPARATUS FOR RECORDING AND REPRODUCING A RADIATION IMAGE

BACKGROUND OF THE INVENTION

1. Field of the Invention

This invention relates to a method and an apparatus for recording and reproducing a radiation image, and more particularly to a method and an apparatus for recording a radiation image on a stimulable phosphor and reproducing the recorded radiation image utilizing stimulability of the stimulable phosphor.

2. Description of the Prior Art

As is well known in the art, a photographic film using a silver halide has generally been employed to record a radiation image. Recently, from the viewpoint of problems such as shortage of silver resource, a method for recording a radiation image without using a silver salt has been desired.

As a method which can take the place of the above-mentioned photography, a method for recording and reproducing a radiation image is known, which comprises the steps of (i) causing a stimulable phosphor to absorb a radiation passing through an object, (ii) stimulating the phosphor by a certain kind of energy to release the energy of the radiation stored in the phosphor as fluorescent light, and (iii) detecting the fluorescent light. For example, British Pat. No. 1,462,769 and Japanese Patent Laid Open No. 29,889/1976 disclose a method included in the above-mentioned method, wherein a heat-stimulable phosphor, viz. a thermoluminescent phosphor, and thermal energy are employed as the stimulable phosphor and the stimulation energy, respectively. That is, in the method disclosed in the above publications, a radiation image storage panel comprising a support base and a thermoluminescent phosphor layer provided thereon is employed, and a radiation image is recorded and reproduced by causing the thermoluminescent phosphor layer of the panel to absorb a radiation passing through an object to store therein the energy of the radiation corresponding to the intensity of the radiation, releasing the radiation energy stored as a light signal by heating the thermoluminescent phosphor layer, and then detecting the light signal. However, the kind of the materials employed in the thermoluminescent phosphor layer and the support base of the panel is severely limited, because the panel is heated in order to convert the radiation image stored therein to a light signal, and hence, it is absolutely required for the panel to be heat resistant (resistance to deformation or deterioration by heat). Accordingly, in view of the above limitation, it is considered to be substantially difficult to practically use the method disclosed in the above publications.

U.S. Pat. No. 3,859,527 discloses another method included in the above-mentioned method and an apparatus therefor wherein a visible ray- or infrared ray-stimulable phosphor and visible rays or infrared rays are employed as the stimulable phosphor and the stimulation energy, respectively. The method disclosed in the above U.S. Patent is considered to be more preferable than that disclosed in said British Patent and said Japanese Patent, because the panel employed in the method of the U.S. Patent is not heated but exposed to visible rays or infrared rays in order to convert the radiation energy stored therein to a light signal, and accordingly, it is not required for the panel to be heat resistant. However, as a visible ray- or infrared ray-stimulable phosphor which can be employed in the method, only several phosphors such as a cerium and samarium activated strontium sulfide phosphor (SrS:Ce,Sm), a europium and samarium activated strontium sulfide phosphor (SrS:Eu,Sm), a europium and samarium activated lanthanum oxysulfide phosphor ($La_2O_2S$:Eu,Sm) and a manganese and halogen activated zinc cadmium sulfide phosphor [(Zn,Cd)S:Mn,X, wherein X is halogen] are known. Further, the sensitivity in the method in which these phosphors are employed is very low because the stimulability of these phosphors is very low. Accordingly, from the viewpoint of the practical use of the method, the improvement of the sensitivity thereof is desired.

SUMMARY OF THE INVENTION

An object of the present invention is to provide a method for recording and reproducing a radiation image using a visible ray- or infrared ray-stimulable phosphor which performs recording and reproducing thereof with high sensitivity.

Another object of the present invention is to provide an apparatus for carrying out the method of the present invention.

In order to accomplish the above-mentioned objects, the inventors conducted an investigation to search for a visible ray- or infrared ray-stimulable phosphor having high stimulability. As a result of the investigation, it was found that an alkaline earth metal fluorohalide phosphor represented by the following formula exhibited markedly high stimulability under stimulation of visible rays or infrared rays:

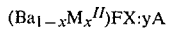

$$(Ba_{1-x}M_x^{II})FX:yA$$

wherein $M^{II}$ is at least one divalent metal selected from the group consisting of Mg, Ca, Sr, Zn and Cd, X is at least one halogen selected from the group consisting of Cl, Br and I, A is at least one element selected from the group consisting of Eu, Tb, Ce, Tm, Dy, Pr, Ho, Nd, Yb and Er, preferably selected from the group consisting of Eu, Tb, Ce and Tm, and x and y are numbers satisfying the conditions of $0 \leq x \leq 0.6$ and $0 \leq y \leq 0.2$.

Hence, it was found that a method for recording and reproducing a radiation image and an apparatus therefor in which the above alkaline earth metal fluorohalide phosphor was employed performed recording and reproducing of a radiation image with remarkably high sensitivity.

The method for recording and reproducing a radiation image of the present invention comprises the steps of (i) causing a visible ray- or infrared ray-stimulable phosphor to absorb a radiation passing through an object, (ii) stimulating the phosphor by stimulation rays selected from visible rays and infrared rays to release the energy of the radiation stored therein as fluorescent light, and (iii) detecting the fluorescent light characterized in that the phosphor is at least one phosphor selected from the groups of alkaline earth metal fluorohalide phosphors represent by the above formula, and that the wavelength of the stimulation rays is not less than 500 nm.

The apparatus for recording and reproducing a radiation image of the present invention comprises (i) a radiation image storage panel comprising a visible ray- or infrared ray-stimulable phosphor which absorbs a radiation passing through an object, (ii) a light source emitting stimulation rays which stimulates the phosphor to release the energy of the radiation stored therein as fluorescent light, and (iii) a detector for detecting the fluorescent light characterized in that the phosphor is at least one phosphor selected from the group of the above-mentioned alkaline earth metal fluorohalide phosphors, and that the wavelength of the stimulation rays is not less than 500 nm.

BRIEF DESCRIPTION OF THE DRAWINGS

FIG. 3 is a graph showing the stimulation spectrum of the BaFBr:Eu phosphor employed in the present invention, and FIG. 4 is a graph showing the stimulated emission spectrum of the BaFCl:Eu phosphor employed in the present invention.

DETAILED DESCRIPTION OF THE INVENTION

The present invention will be described in detail hereinbelow.

Figure 1:
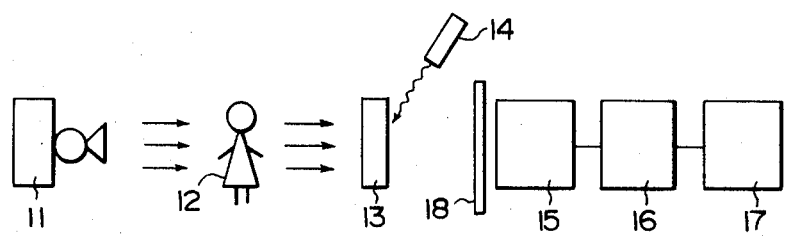
FIG. 1 schematically shows a method and an apparatus for recording and reproducing a radiation image in accordance with an embodiment of the present invention.

In an embodiment of the present invention, a radiation source 11, an object 12, a radiation image storage panel 13 having a phosphor layer comprising the above-mentioned alkaline earth metal fluorohalide phosphor, a light source 14 emitting visible rays having a wavelength of not less than 500 nm or infrared rays which stimulate the phosphor layer to release a radiation energy stored therein as fluorescent light, a photosensor 15 for detecting the fluorescent light emitted from the panel 13, a reproduction device 16 for converting an electrical signal obtained by the photosensor 15 to an image corresponding to the radiation image, a display device 17 for displaying the image, and a filter 18 for cutting the stimulation rays emitted from the light source 14 and reflected by the panel 13 and for transmitting only the fluorescent light emitted from the panel 13 are arranged as shown in FIG. 1. In the embodiment of the present invention shown in FIG. 1, the photosensor 15 is used as a detector for detecting fluorescent light, and reproduction of a radiation image is performed by means of the photosensor 15, the reproduction device 16 and the display device 17. However, means for reproducing a radiation image is not limited thereto.

As shown in FIG. 1, the object 12 is positioned between the radiation source 11 and the radiation image storage panel 13. When the object 12 is exposed to a radiation from the source 11, the radiation passes through the object 12. The intensity of the radiation which has passed through the object 12 represents the transmittance of the object 12. Therefore, an image which represents the pattern of transmittance of the object 12 is obtained by means of the radiation impinging upon the radiation image storage panel 13. The radiation in the form of the image representing the pattern of transmittance of the object 12 is absorbed by the phosphor layer of the panel 13, and electrons or holes are generated in the phosphor layer. The amount of the electrons or holes generated are in proportion to the amount of the radiation energy absorbed. The electrons or holes are stored in the trap level of the phosphor, and thus, the radiation image is stored in the radiation image storage panel 13.

Then, the radiation image stored in the panel 13 is visualized by stimulation with visible rays or infrared rays emitted from the light source 14. That is, the phosphor layer of the panel 13 is exposed to visible rays having a wavelength of not less than 500 nm or infrared rays emitted from the light source 14, whereby the electrons or holes stored in the trap level of the phosphor are expelled therefrom, and the radiation image stored in the panel 13 is released as fluorescent light. The luminance of the fluorescent light emitted from the panel 13 is in proportion to the numbers of the electrons or holes stored in the phosphor layer, that is, the amount of the radiation energy absorbed thereby. The fluorescent light (light signal) is detected and converted to an electrical signal by the photosensor 15 such as a photomultiplier. The electrical signal obtained is converted to an image corresponding to the radiation image by the reproduction device 16, and the image is displayed by the display device 17. Thus, the radiation image is reproduced.

The radiation image storage panel 13 and the light source 14 employed in the apparatus for recording and reproducing a radiation image of the present invention will be described in detail hereinbelow.

Figure 2A:
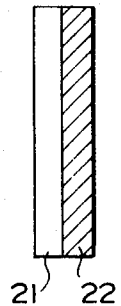
FIGS. 2A and 2B are cross-sectional views of embodiments of a radiation image storage panel used in the method and apparatus of the present invention.

As shown in FIG. 2A, the radiation image storage panel comprises a support base 21 and a phosphor layer 22 disposed thereon. The phosphor layer 22 comprises at least one phosphor selected from the group of alkaline earth metal fluorohalide phosphors represented by the formula

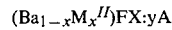

$(Ba_{1-x}M_x^{II})FX:yA$ wherein $M^{II}$ is at least one divalent metal selected from the group consisting of Mg, Ca, Sr, Zn and Cd, X is at least one halogen selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$. When $M^{II}$, X, A, x and y are defined as above, the $(Ba_{1-x}M_x^{II})FX:yA$ phosphor emits stimulated light of high luminance when stimulated by visible rays having a wavelength of not less than 500 nm or infrared rays after exposure to a radiation such as x-rays, ultraviolet rays and cathode rays. The phosphor exhibits stimulated emission of high luminance even thoush the phosphor does not contain the activator A, that is, y is zero. However, when the amount of the activator A is larger than 0.2 gram atoms per 1 mol of the matrix $[(Ba_{1-x}M_x^{II})FX]$, that is, when y is larger than 0.2, the luminance of stimulated emission of the phosphor markedly decreases, and the phosphor cannot be employed in the radiation image storage panel. In particular, when y is within the range of $10^{-6}$ to $5 \times 10^{-3}$, the luminance of stimulated emission of the phosphor markedly increases, and accordingly, recording and reproducing of a radiation image can be performed with markedly high sensitivity by employing the phosphor in the radiation image storage panel. Further, when barium which is one of the matrix components of the $(Ba_{1-x}M_x^{II})FX:yA$ phosphor is replaced with the divalent metal $M^{II}$ in an amount of larger than 0.6 gram atoms, that is, when x is larger than 0.6, the luminance of stimulated emission of the phosphor markedly decreases, and accordingly, the phosphor cannot be employed in the radiation image storage panel. Preferably, x is not larger than 0.5.

For example, the radiation image storage panel shown in FIG. 1 is manufactured by the following manufacturing process.

A coating dispersion having a viscosity of 50 centistokes is prepared by mixing 8 parts by weight of the above-mentioned alkaline earth metal fluorohalide phosphor and 1 part by weight of a nitrocellulose using a solvent (a mixture of acetone, ethyl acetate and butyl acetate). Then, the coating dispersion is uniformly applied to a horizontally placed polyethylene terephthalate film (support base) and dried naturally for one day to form a phosphor layer of about 300μ thick thereon. A transparent glass plate or a metal foil such as an aluminium foil can also be employed as a support base.

Figure 2B:
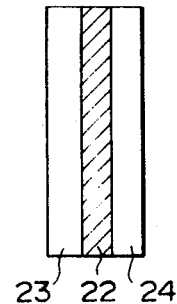

A radiation image storage panel having the structure shown in FIG. 2B can also be employed in the method and apparatus of the present invention. The radiation image storage panel of FIG. 2B comprises two transparent support bases 23, 24 and a phosphor layer 22 provided therebetween. Of course, the phosphor layer 22 comprises the above-mentioned alkaline earth metal fluorohalide phosphor. For example, the radiation image storage panel is manufactured by sandwiching a phosphor layer having a proper thickness between two glass plates, and then sealing the edges of the phosphor layer.

As a light source emitting stimulation rays which stimulates the phosphor layer of the above-mentioned radiation image storage panel, a light source emitting light of a single wavelength such as a He-Ne laser beam (633 nm), a YAG laser beam (1064 nm) and a ruby laser beam (694 nm) can be employed as well as a light source emitting light having a band spectrum within the range of visible rays having a wavelength of not less than 500 nm and infrared rays. In particular, a high stimulation energy can be obtained by employing laser beam. Among laser beams, the He-Ne laser beam is preferable.

FIG. 3 is a graph showing the relationship between the wavelength of the stimulation rays and the luminance of the stimulated light, that is, the stimulation spectrum, of the BaFBr:0.0008 Eu phosphor employed in the present invention. The stimulation spectrum was obtained by exposing the BaFBr:0.0008 Eu phosphor to x-rays of 80 KVp, stimulating the phosphor with visible and infrared rays varying the wavelength thereof, and then measuring the luminance of the stimulated light. As is clear from FIG. 3, the BaFBr:Eu phosphor can be stimulated with rays having a wavelength within the range of 500 to 1100 nm, and the optimum stimulation thereof can be performed within the range of 500 to 700 nm. Although the wavelength range of the stimulation rays of the $(Ba_{1-x}M_x^{II})FX:yA$ phosphors which can be employed in the present invention varies slightly depending upon the variation in the composition thereof, it is always about from 500 to 1100 nm, and the optimum wavelength range thereof is from 500 to 700 nm.

In the method for recording and reproducing a radiation image using a stimulable phosphor, it is desirable to use a visible ray-stimulable phosphor rather than an infrared ray-stimulable phosphor as the stimulable phosphor. Because, the trap of the infrared ray-stimulable phosphor is shallower than that of the visible ray-stimulable phosphor, and accordingly, the radiation image storage panel comprising the infrared ray-stimulable phosphor exhibits remarkable fading, and hence, the radiation image storage period thereof is short. For example, when the panel comprising the infrared ray-stimulable phosphor is scanned with infrared rays, and the fluorescent light emitted therefrom is processed electrically, a certain period of time is required to scan the overall face of the panel, and accordingly, there is the possibility that the difference arises between the initial output and the final output even though the initial portion and the final portion of the panel absorb the same amount of a radiation beforehand.

For the reason described above, in the method for recording and reproducing a radiation image using a stimulable phosphor, it is desirable to use a stimulable phosphor which has as deep a trap as possible and accordingly, is stimulated efficiently by rays having high energy, that is, rays of short wavelength. As described hereinbefore, the optimum stimulation rays of the $(Ba_{1-x}M_x^{II})FX:yA$ phosphor employed in the present invention are visible rays having a wavelength within the range of 500 to 700 nm.

Accordingly, the radiation image storage panel used in the method and apparatus of the present invention exhibits little fading and has high preservability.

Further, in the method for recording and reproducing a radiation image using a stimulable phosphor, it is desirable to use a stimulable phosphor which emits stimulated light of as short a wavelength as possible. The reasons thereof are as follows.

(i) In detecting the stimulated light emitted from the panel, it is necessary to separate the stimulated light from the stimulation rays reflected by the panel.

(ii) The photosensor for detecting the stimulated light emitted from the panel generally has high sensitivity to rays having a wavelength of shorter than 600 nm.

The $(Ba_{1-x}M_x^{II})FX:yA$ phosphor employed in the present invention satisfies the above condition. That is, the $(Ba_{1-x}M_x^{II})FX:yA$ phosphor exhibits a stimulated emission having a main peak in the wavelength region shorter than 500 nm. Accordingly, the stimulated light emitted from the $(Ba_{1-x}M_x^{II})FX:yA$ phosphor can easily be separated from the stimulation rays. Further, the spectrum of the stimulated light is in good agreement with the spectral sensitivity of the photosensor and therefore, can be detected efficiently by the photosensor. The stimulated emission spectrum of the BaFCl:Eu phosphor measured by stimulating the phosphor with a He-Ne laser beam after exposure to x-rays of 80 KVp is illustrated in FIG. 4.

Table 1 below shows the sensitivity of the radiation image storage panel used in the method and apparatus of the present invention (No. 2–No. 8) in comparison with that of the conventional radiation image storage panel employing SrS:Eu,Sm phosphor (No. 1). The sensitivity is represented by the relative luminance of the stimulated light emitted from the panel with reference to that of the stimulated light emitted from the conventional panel which is defined to be 1. The luminance was measured by exposing the phosphor layer of the panel to x-rays of 80 KVp, stimulating the phosphor layer with a He-Ne laser beam, and detecting the fluorescent light (stimulated light) emitted from the phosphor layer by a photosensor (a photomultiplier having a spectral sensitivity of S-5).

TABLE 1

| No. | Phosphor of the Panel | Relative Sensitivity |
|---|---|---|
| 1 | SrS:0.0001Eu,0.0001Sm | 1 |
| 2 | BaFCl | 300 |
| 3 | BaFCl:0.001Eu | 1000 |

TABLE 1-continued

| No. | Phosphor of the Panel | Relative Sensitivity |
| --- | --- | --- |
| 4 | BaFCl:0.001Ce | 500 |
| 5 | BaFBr:0.0008Eu | 2000 |
| 6 | $(Ba_{0.9},Mg_{0.1})FBr:0.001Eu$ | 3000 |
| 7 | $(Ba_{0.7},Ca_{0.3})FBr:0.003Eu$ | 3000 |
| 8 | BaFBr:0.0001Ce,0.0001Tb | 2500 |

As is clear from Table 1, the radiation image storage panels used in the method and apparatus of the present invention (No. 2–No. 8) have a markedly high sensitivity than the conventional radiation image storage panel (No. 1). Therefore, the method and apparatus of the present invention perform recording and reproducing of a radiation image with remarkably higher sensitivity than the conventional method and apparatus.

We claim:

1. A method for recording and reproducing a radiation image comprising the steps of (i) causing a visible ray- or infrared ray-stimulable phosphor to absorb a radiation passing through an object, (ii) stimulating said phosphor with stimulation rays selected from visible rays and infrared rays to release the energy of the radiation stored therein as fluorescent light, and (iii) detecting said fluorescent light characterized in that said phosphor is at least one phosphor selected from the group of alkaline earth metal fluorohalide phosphors represented by the formula $$(Ba_{1-x}M_x^{II})FX:yA$$

wherein $M^{II}$ is at least one divalent metal selected from the group consisting of Mg, Ca, Sr, Zn and Cd, X is at least one halogen selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, and that the wavelength of said stimulation rays is not less than 500 nm.

2. A method as defined in claim 1 wherein the wavelength of said stimulation rays is not more than 1100 nm.

3. A method as defined in claim 1 wherein the wavelength of said stimulation rays is within the range of 500 to 700 nm.

4. A method as defined in claim 1 wherein said stimulation rays is a laser beam.

5. A method as defined in claim 4 wherein said laser beam is a He-Ne laser beam.

6. An apparatus for recording and reproducing a radiation image comprising (i) a radiation image storage panel comprising a visible ray- or infrared ray-stimulable phosphor which absorbs a radiation passing through an object, (ii) a light source emitting stimulation rays which stimulate said phosphor to release the energy of the radiation stored therein as fluorescent light, and (iii) a detector for detecting said fluorescent light characterized in that said phosphor is at least one phosphor selected from the group of alkaline earth metal fluorohalide phosphors represented by the formula $$(Ba_{1-x}M_x^{II})FX:yA$$

wherein $M^{II}$ is at least one divalent metal selected from the group consisting of Mg, Ca, Sr, Zn and Cd, X is at least one halogen selected from the group consisting of Cl, Br, and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, and that the wavelength of said stimulation rays is not less than 500 nm.

7. An apparatus as defined in claim 6 wherein the wavelength of said stimulation rays is not more than 1100 nm.

8. An apparatus as defined in claim 6 wherein the wavelength of said stimulation rays is within the range of 500 to 700 nm.

9. An apparatus as defined in claim 6 wherein said stimulation rays is a laser beam.

10. An apparatus as defined in claim 9 wherein said laser beam is a He-Ne laser beam.

* * * * *